2,937,209
Patented May 17, 1960

2,937,209

HALOGENATION OF PYRENE

Paul A. Studer, Milburn, N.J., and Joseph S. Milazzo, Bronx, N.Y., assignors to General Aniline & Film Corporation, New York, N.Y., a corporation of Delaware No Drawing. Application June 26, 1957
Serial No. 668,045

8 Claims. (Cl. 260—649)

The present invention relates to the preparation of halogen derivatives of pyrene. More particularly, this invention relates to a novel process for the halogenation of pyrene.

Heretofore, halogen pyrenes which, as is well-known, are employed as starting materials or as intermediates in the manufacture of dyestuffs, have been prepared by halogenating pyrene in an organic solvent medium such as, for example, nitrobenzene or trichlorobenzene. The use of the organic solvents made for an expensive process. It is accordingly, an important object of our invention to provide an economical process for halogenating pyrene employing an aqueous reaction medium.

Other objects and advantages of our invention will appear from the following detailed description and claims.

We have now made the surprising discovery that halogenation, i.e. chlorination and bromination, of pyrene may be effected employing an aqueous reaction medium. Halogenating pyrene in accordance with our process produces polyhalogen pyrenes such as tetra- and hexa-chloropyrenes and tetra- and hexa-bromopyrenes, for example, from which are formed halogenpyrenequinones which are convertible into vat dyestuffs of the type produced by condensing 1,4,5,8-naphthalene tetracarboxylic acid with orthodiamines. Our discovery is of great economic value since the use of an aqueous reaction medium effects a substantial reduction in the cost of producing the dyestuff materials.

In accordance with the process of our invention, an aqueous suspension is formed of pyrene in finely divided condition and the halogen is added, preferably slowly, to the aqueous suspension at an elevated temperature. After the addition of the halogen the reaction mixture is heated to a temperature of 80 to 100° C. and held at this temperature for an appreciable length of time, i.e. on the order of 5 to 30 hours. The halogenation product is then isolated in any suitable manner, washed and dried. The halogenated pyrene is obtained in the form of a brown or yellowish powder having a halogen content of from about 40 to 62%.

A preferred method of carrying out the chlorination of pyrene comprises mixing ground pyrene, water and hydrochloric acid and agitating the mixture while the same is being heated to an elevated temperature until a smooth suspension is obtained. Chlorine gas is then added to the aqueous suspension, preferably in a slow stream. After about one-half of the predetermined amount of chlorine has been added to the reaction mixture, the temperature of the reaction mixture is raised and the chlorine addition is continued. At the completion of the chlorine addition the reaction mixture is maintained at the raised temperature for 5 hours longer. The chlorination product is then isolated, washed and dried, a brown colored powder being obtained.

The bromination of pyrene is preferably effected by mixing ground pyrene and water, and agitating the mixture until a smooth suspension is obtained. To the suspension is then added dropwise at a slightly elevated temperature a mixture of glacial acetic acid, bromine and hydrochloric acid. After the brominating material is added, the temperature of the reaction mixture is raised and the reaction mixture maintained at the raised temperature for 20 hours longer. The resulting bromination product is isolated in any suitable manner, as by drawing in hot water, washed and dried, a pale yellow powder is obtained.

The following examples are given for the purpose of illustrating our invention and are not to be considered in any way limitative.

*Example I*

40.4 grams of ground pyrene, 400 grams of water and 80 grams of 31.5% hydrochloric acid are charged into a 1-liter, 4-neck flask equipped with agitator, thermometer and condenser. The mixture is agitated, while being heated to 60–65° C., until a smooth suspension is obtained. A slow stream of chlorine gas is then added to the suspension. The temperature of the suspension is raised to 80–100° C. after one-half of the chlorine has been added to the suspension, and then the addition of the chlorine is continued. At the completion of the chlorine addition, the reaction mixture is held at the reaction temperature of 80–100° C. for 5 hours longer. The chlorination product is isolated by filtration, the filter cake washed neutral with hot water and dried.

There was obtained 62 grams of a brown powder which contained 42% of chlorine.

*Example II*

20.2 grams of ground pyrene and 100 cc. of water are charged into a 500 cc., 4-neck flask equipped with agitator, thermometer and condenser, and the mixture is agitated until a smooth suspension is obtained. There is then added dropwise at 30 to 70° C. a mixture of 80 grams of glacial acetic acid, 80 grams of bromine and 80 grams of 31.5% hydrochloric acid. After the bromine addition is completed, the reaction mixture is heated to 80–100° C. and is held at this temperature for 20 hours longer. The resulting bromination product is isolated by drowning the reaction mass in 3 liters of hot water, converting the excess bromine to bromide by the addition of 50 grams of 36% sodium bisulfite solution, filtering and washing the filter cake free of acid with water.

After drying, there was obtained 50 grams of a pale yellow powder containing 61% of bromine.

*Example III*

20.2 grams of ground pyrene and 100 cc. of water are charged into a 500 cc., 4-neck flask equipped with agitator, thermometer and condenser, and the mixture is agitated until a smooth suspension is obtained. There is then added to the suspension dropwise at 30 to 70° C., a mixture of 20 grams of glacial acetic acid, 20 grams of bromine and 20 grams of 31.5% hydrochloric acid. After the completion of the bromine addition, the reaction mixture is heated slowly to 80–100° C. and is held at this temperature for 10 hours longer. There is then added to the reaction mixture in a slow stream 17.8 grams of chlorine or an equivalent amount of sodium hypochlorite solution and the reaction mixture is held at 80–100° C. for 20 hours longer. The bromination product is isolated in the same manner as described in Example II.

There was obtained 50 grams of a pale yellow powder containing 61.8% of bromine.

*Example IV*

40.4 grams of ground pyrene, 82.4 grams of sodium bromide and 250 cc. of water are charged into a 1-liter, 4-neck flask equipped with an agitator, thermometer and condenser. The slurry formed by agitation is heated to 50 to 70° C. After the sodium bromide is dissolved, there is added 24 grams of 31% hydrochloric acid and then in a slow stream 50 grams of chlorine. After the addition of chlorine is completed, the temperature of the reaction mixture is mtaintained at 80–100° C. for 20 hours longer. The bromination product is isolated as in Example I.

There was obtained 103 grams of a yellow colored powder which contained 59.4% of bromine.

The pyrene derivatives produced in accordance with the process of our invention are starting materials as well as intermediate products for the preparation of dyestuffs. Thus, vat dyestuffs may be obtained by the exchange of chlorine in tetrachloropyrenequinone for the basic radicals. The octohalogentetrahydropyrenes, the hexahalogenpyrenes or the quinones obtainable therefrom may also be transformed by oxidation into dihalogen derivatives of the 1,4,5,8-napthalene tetracarboxylic acid, and the latter into vat dyestuffs by condensation with aromatic ortho-diamines.

It is to be understood that the foregoing detailed description is merely given by way of illustration and that many variations may be made therein without departing from the spirit of our invention.

Having described our invention, what we desire to secure by Letters Patent is:

1. Process for preparing chlorine derivatives of pyrene, which comprises forming a reaction mixture of hydrochloric acid in an aqueous medium consisting essentially of pyrene in particulate form and water, agitating the aqueous mixture to form a suspension, adding chlorine gas to said suspension, heating the reaction mixture to a temperature of 80 to 100° C., maintaining said reaction mixture at said elevated temperature for an appreciable length of time, and then isolating from the reaction mixture the chlorine derivative of pyrene formed.

2. Process for preparing chlorine derivatives of pyrene, which comprises forming a reaction mixture of hydrochloric acid in an aqueous medium consisting essentially of pyrene in particulate form and water, agitating the aqueous mixture to form a suspension, adding one-half of a predetermined amount of chlorine gas to said suspension, heating said suspension to a temperature of 80 to 100° C., adding the remainder of the chlorine gas to said suspension, maintaining the reaction mixture at said elevated temperature for 5 hours longer, and isolating from the reaction mixture the chlorine derivative formed.

3. Process for preparing bromine derivatives of pyrene, which comprises forming a mixture consisting essentially of pyrene in particulate form and water, agitating said aqueous mixture to form a suspension, adding to said suspension a mixture of glacial acetic acid, bromine and hydrochloric acid, heating the reaction mixture to 80–100° C., maintaining said reaction mixture at said elevated temperature for an appreciable length of time, and then isolating from the reaction mixture the bromine derivative of pyrene formed.

4. Process for preparing bromine derivatives of pyrene, which comprises forming a mixture consisting essentially of pyrene in particulate form and water, agitating said aqueous mixture to form a suspension, adding dropwise at a temperature of 30 to 70° C. a mixture of glacial acetic acid, bromine and hydrochloric acid to said suspension, raising the temperature of the reaction mixture to 80–100° C., maintaining said reaction mixture at said elevated temperature for from 20 to 30 hours, and then isolating from said reaction mixture the bromine derivative of pyrene formed.

5. Process for preparing bromine derivatives of pyrene, which comprises forming a mixture consisting essentially of pyrene in particulate form and water, agitating said aqueous mixture to form a suspension, adding dropwise at a temperature of 30 to 70° C. a mixture of glacial acetic acid, bromine and hydrochloric acid to said suspension, raising the temperature of the reaction mixture to 80–100° C., maintaining said reaction mixture at said elevated temperature for from 20 to 30 hours, slowly adding to said reaction mixture a reactant selected from group consisting of chlorine gas and sodium hypochlorite solution, and then isolating from said reaction mixture the bromine derivative of pyrene formed.

6. Process for preparing bromine derivatives of pyrene, which comprises forming an aqueous slurry of sodium bromide in a medium consisting essentially of pyrene in particulate form and water, heating the slurry with agitation to an elevated temperature to dissolve the sodium bromide, adding to said slurry hydrochloric acid and then chlorine gas, then continuing the reaction for 20 hours at 80–100° C., isolating from the reaction mixture all bromine derivatives of pyrene formed.

7. Process for preparing bromine derivatives of pyrene, which comprises forming a slurry of sodium bromide, in an aqueous medium consisting essentially of pyrene in particulate form and water, heating the aqueous slurry with agitation to a temperature of 50 to 70° C., after the sodium bromide is dissolved adding to said aqueous slurry hydrochloric acid and then in a slow stream chlorine gas, after the completion of the chlorine addition maintaining reaction for 20 hours at 80–100° C., isolating from said reaction mixture the bromine derivative of pyrene formed.

8. Process for preparing halogen derivatives of pyrene, which comprises forming a reaction mixture of a halogenating agent, selected from the group consisting of chlorinating agents and brominating agents, in an aqueous medium consisting essentially of ground pyrene and water, heating said reaction mixture to a temperature of 80 to 100° C., maintaining said reaction mixture at said elevated temperature for an appreciable length of time, and then isolating from the reaction mixture the halogen derivative formed.

References Cited in the file of this patent

UNITED STATES PATENTS

| | | |
|---|---|---|
| 2,018,935 | Vollman et al. | Oct. 29, 1935 |
| 2,094,227 | Wolfram et al. | Sept. 28, 1937 |
| 2,474,777 | Carter | June 28, 1949 |

FOREIGN PATENTS

| | | |
|---|---|---|
| 763,390 | Great Britain | Dec. 12, 1956 |
| 1,104,648 | France | June 15, 1955 |